(12) United States Patent
Singh et al.

(10) Patent No.: US 10,719,699 B2
(45) Date of Patent: Jul. 21, 2020

(54) PEDESTRIAN DETECTION METHOD AND SYSTEM IN VEHICLE

(71) Applicant: MANDO CORPORATION, Pyeongtaek-si (KR)

(72) Inventors: Jitesh Kumar Singh, Gurgaon (IN); Arpit Awasthi, Gurgaon (IN); Shripad Arun Kondra, Gurgaon (IN); Young-Ha Cho, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 197 days.

(21) Appl. No.: 15/784,060

(22) Filed: Oct. 13, 2017

(65) Prior Publication Data

US 2018/0107871 A1 Apr. 19, 2018

(30) Foreign Application Priority Data

Oct. 14, 2016 (KR) ........................ 10-2016-0133802

(51) Int. Cl.
| | |
|---|---|
| *G06K 9/00* | (2006.01) |
| *G01S 13/931* | (2020.01) |
| *G01S 13/86* | (2006.01) |
| *G08G 1/16* | (2006.01) |
| *B60R 21/0134* | (2006.01) |

(52) U.S. Cl.
CPC ........ *G06K 9/00369* (2013.01); *G01S 13/867* (2013.01); *G01S 13/931* (2013.01); *G06K 9/00805* (2013.01); *G08G 1/165* (2013.01); *G08G 1/166* (2013.01); *B60R 21/0134* (2013.01); *B60R 2300/301* (2013.01); *B60R 2300/307* (2013.01); *G06T 2207/30261* (2013.01)

(58) Field of Classification Search
CPC ............ G06K 9/00369; G06K 9/00805; G01S 13/867; G01S 13/931; G08G 1/165; G08G 1/166; B60R 21/0134; B60R 2300/301; B60R 2300/307; G06T 2207/30261
See application file for complete search history.

(56) References Cited

U.S. PATENT DOCUMENTS 9,383,445 B2  7/2016  Lu et al.
9,652,677 B2  5/2017  Umezaki et al.
(Continued)

FOREIGN PATENT DOCUMENTS

| JP | 2003-302470 | 10/2003 |
| JP | 2010-282388 | 12/2010 |
| KR | 10-1569411 | 11/2015 |

OTHER PUBLICATIONS

Office Action dated Dec. 28, 2017 for Korean Patent Application No. 10-2016-0133802 and its English machine translation by Google Translate.

*Primary Examiner* — Shefali D Goradia
(74) *Attorney, Agent, or Firm* — Ladas & Parry, LLP

(57) ABSTRACT

Disclosed are a pedestrian detection method of a vehicle and a pedestrian detection system thereof. The pedestrian detection method includes transmitting and receiving a radar signal to and from an object in front of a vehicle to sense the object; capturing an exterior image of the vehicle; calculating a distance between the vehicle and the sensed object, detecting the sensed object in the captured image, and setting a region of interest (ROI) including the sensed object; and detecting a pedestrian in the ROI.

10 Claims, 7 Drawing Sheets

(56) References Cited

U.S. PATENT DOCUMENTS

| | | | |
|---|---|---|---|
| 9,975,550 B2* | 5/2018 | Katoh | G06T 7/60 |
| 2008/0164985 A1* | 7/2008 | Iketani | G01S 7/4802 |
| | | | 340/435 |
| 2011/0037639 A1* | 2/2011 | Duran Toro | G01S 13/885 |
| | | | 342/22 |
| 2011/0190972 A1* | 8/2011 | Timmons | G01C 21/34 |
| | | | 701/31.4 |

* cited by examiner

[FIG. 1]
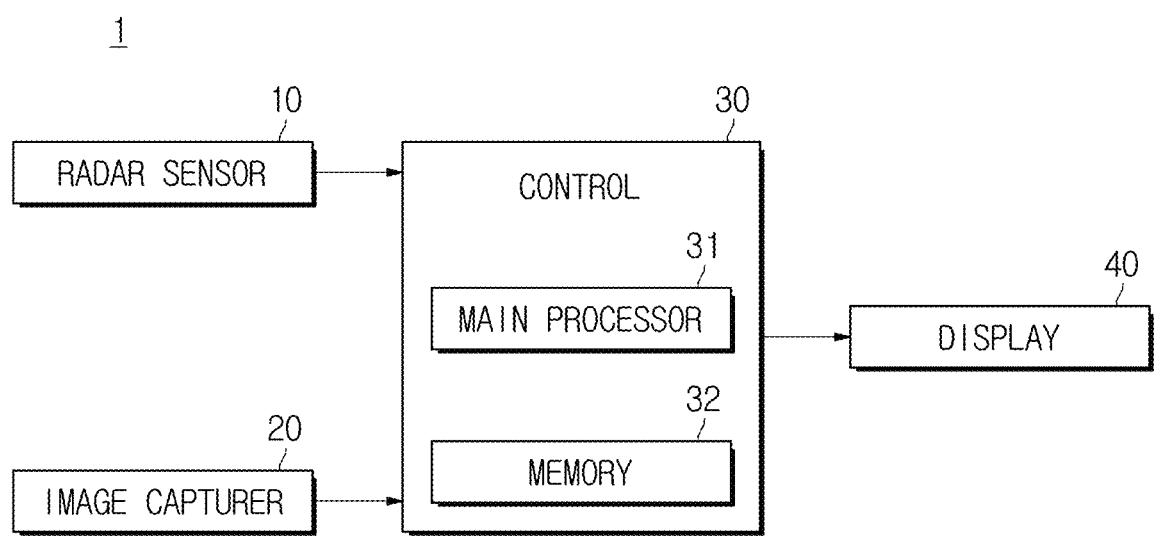

[FIG. 2]
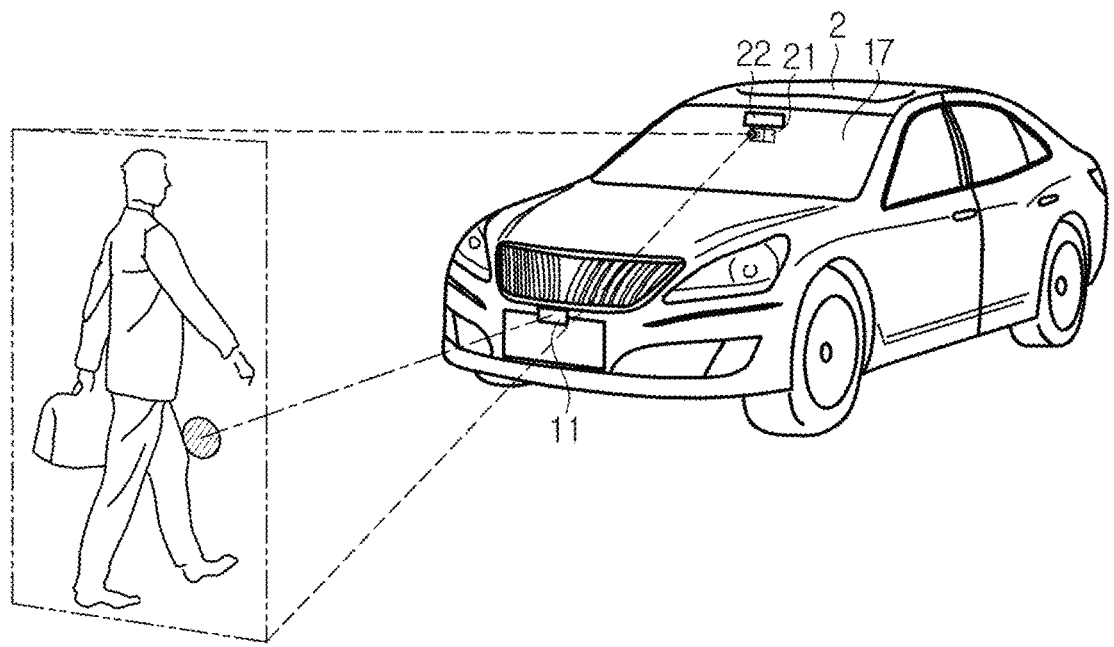

[FIG. 3]
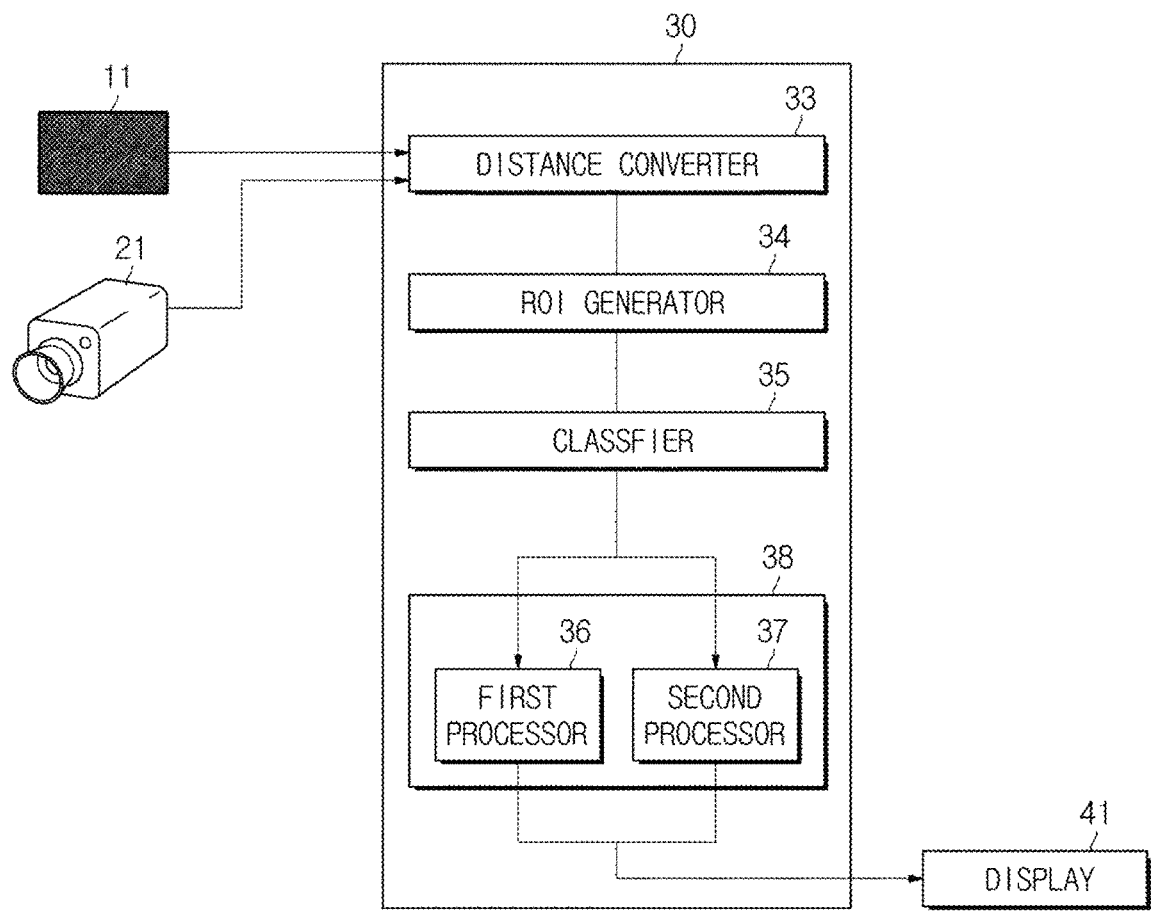

[FIG. 4]
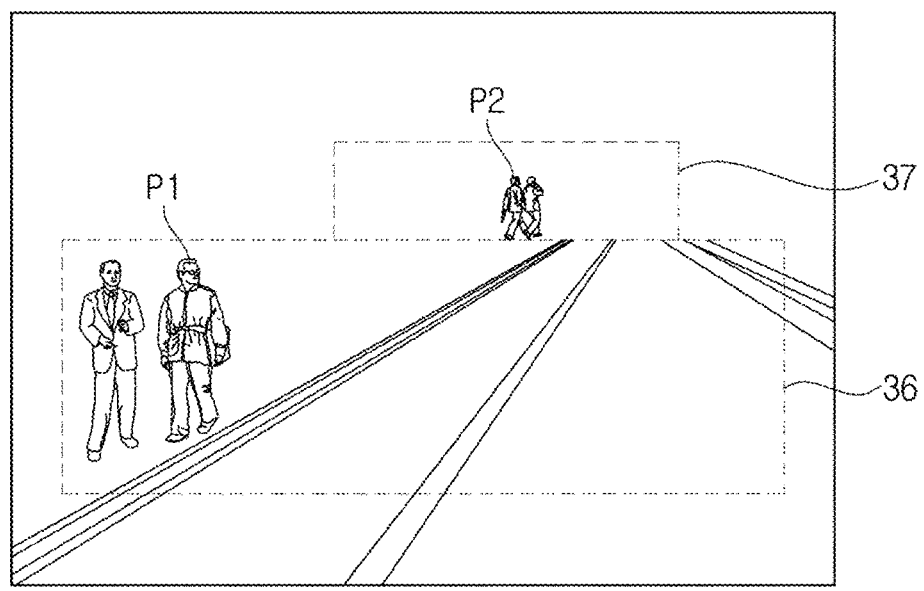

[FIG. 5]
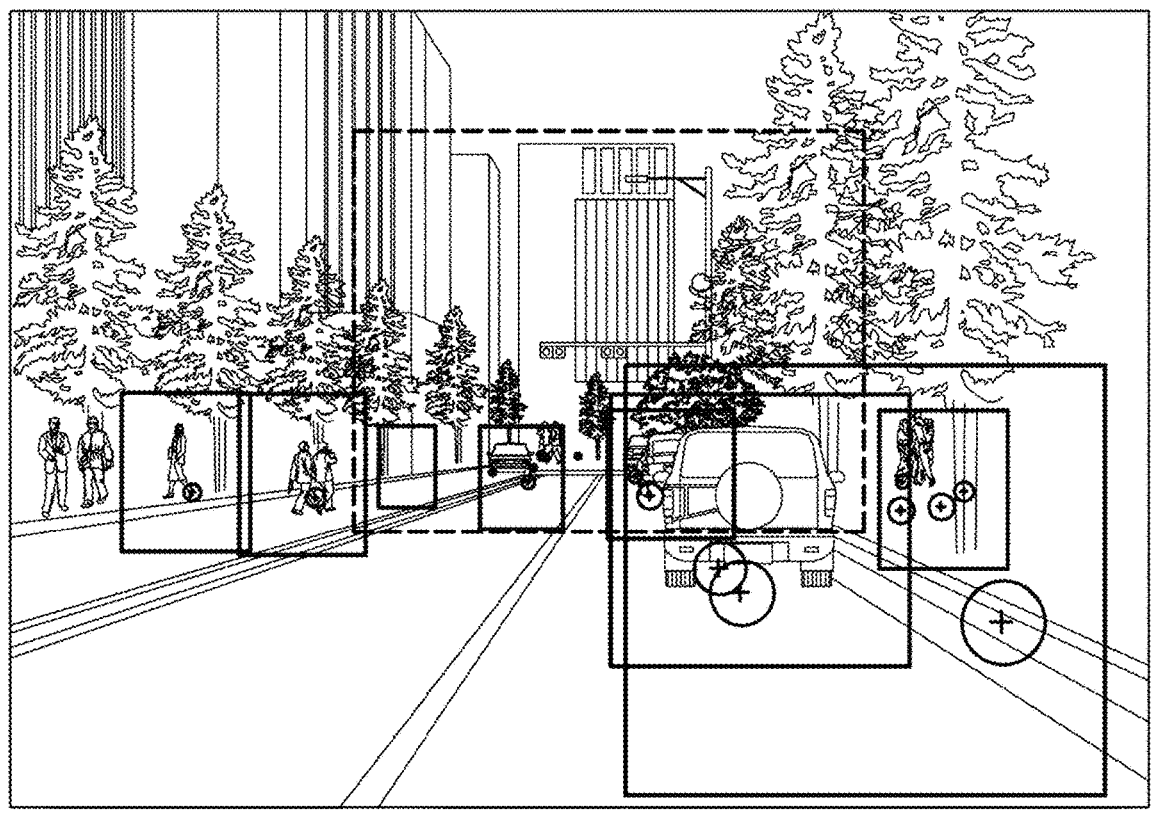

[FIG. 6]
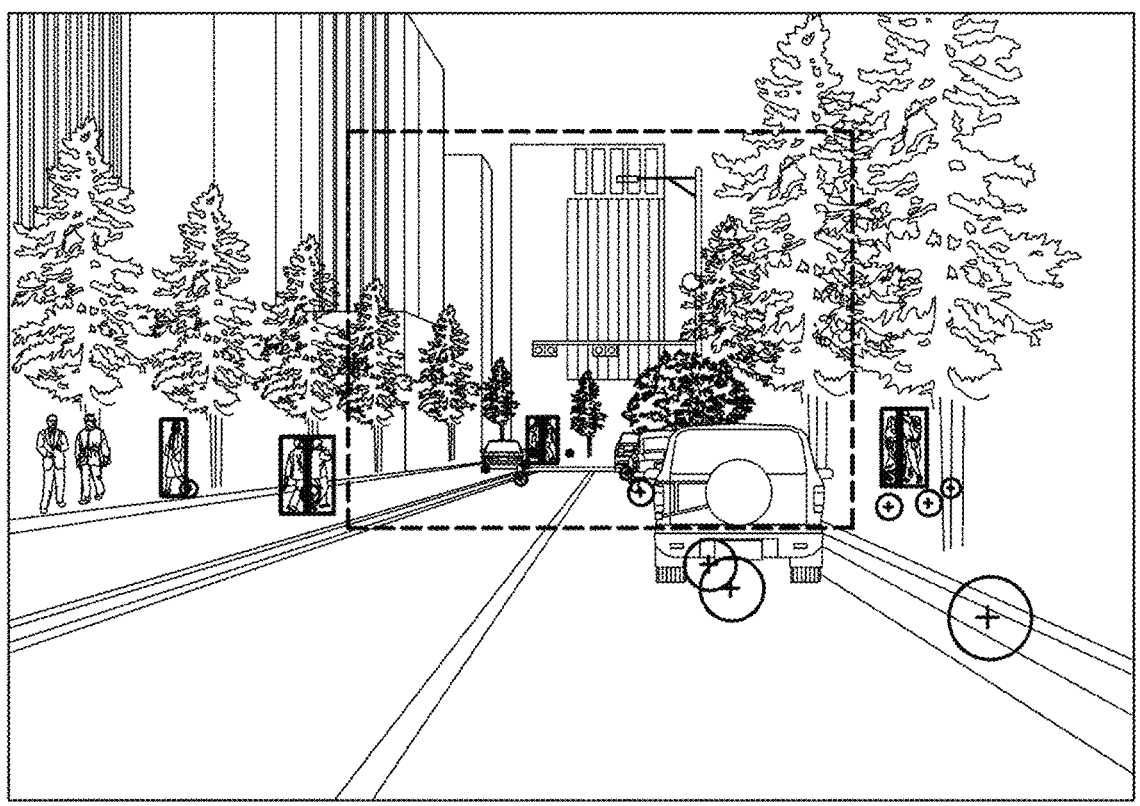

[FIG. 7]
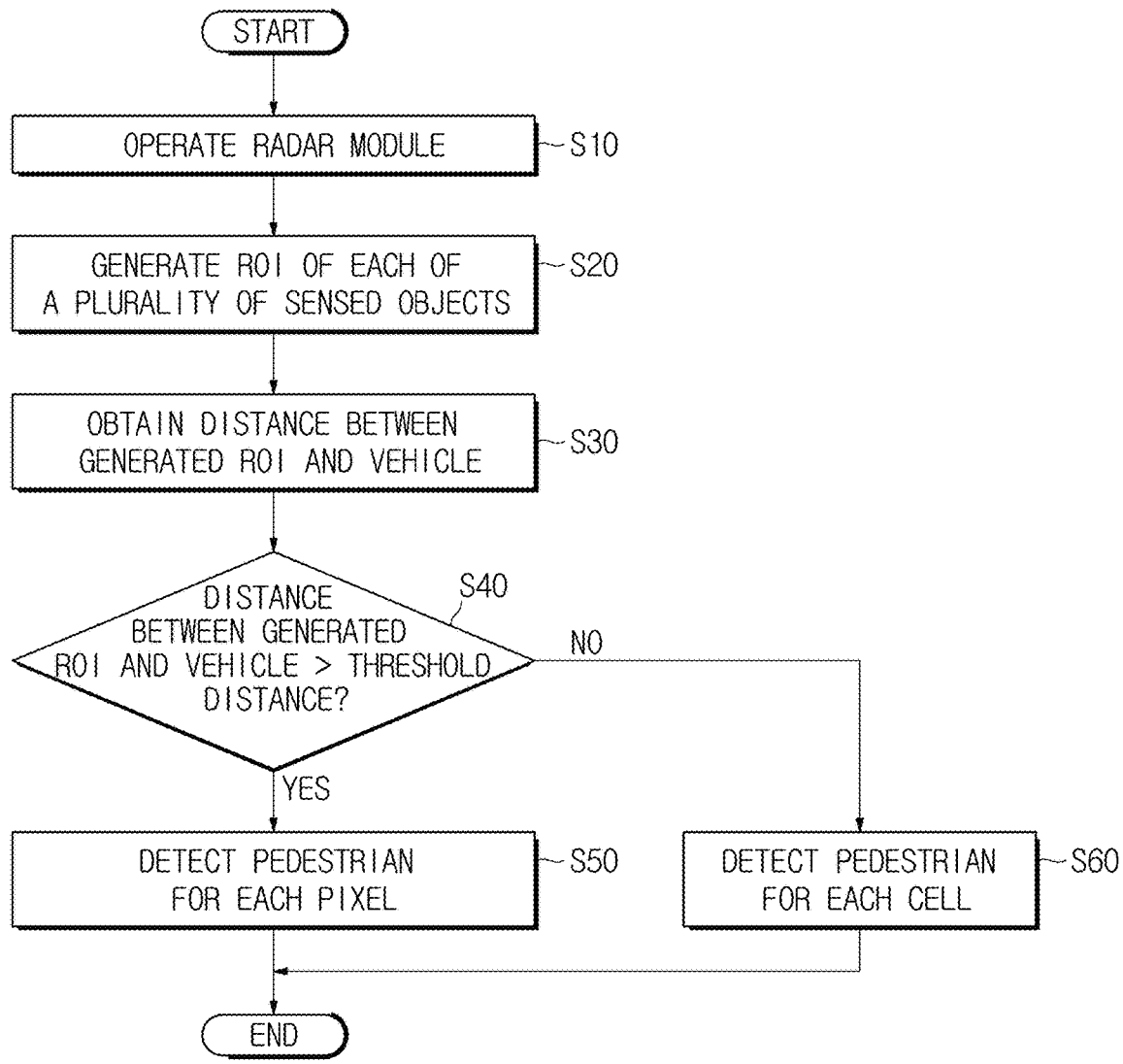

PEDESTRIAN DETECTION METHOD AND SYSTEM IN VEHICLE

This application claims the benefit of Korean Patent Application No. 2016-0133802, filed on Oct. 14, 2016 in the Korean Intellectual Property Office, the disclosure of which is incorporated herein by reference.

BACKGROUND

1. Field

Embodiments of the present disclosure relate to a system for sensing an object ahead of a vehicle on the basis of at least one sensor installed at the vehicle, detecting the sensed object as a pedestrian, and tracking the pedestrian, and a control method thereof.

2. Description of the Related Art

These days, a system is being developed to detect a pedestrian in an image captured by a camera installed at a front side of a vehicle and to notify a driver of the fact that the pedestrian is located ahead of the vehicle in a case in which the driver does not detect an outside situation.

For example, since a driving view rapidly diminishes at night, a driver may not see a pedestrian. To prevent such a situation, research is progressing on a system that allows a driver to secure a field of view using a sensor such as a near-infrared light camera or a far-infrared light camera, or a system that prewarns a driver of a pedestrian through night pedestrian detection.

Also, with regard to pedestrian protection, a system is being developed to detect a pedestrian in advance using a camera equipped on a vehicle and prevent an accident involving the pedestrian in advance through a configuration for warning a driver or controlling the vehicle to perform braking.

In addition, a system is being developed to sense an object ahead of a vehicle using a radar installed at a front side of the vehicle and notify a driver that a pedestrian is located ahead of the vehicle.

However, since the radar installed at the front side of the vehicle obtains two-dimensional information from an image acquired through a camera instead of sensing the object using a three-dimensional coordinate system (X, Y, and Z), a technique is being developed to improve accuracy of tracking on the basis of a position and movement of an object including a pedestrian by fusing a radar sensor and a camera sensor.

SUMMARY

Therefore, it is an aspect of the present disclosure to continuously detect and track an object using both a radar sensor and an image sensor even when object detection fails.

Further, it is an aspect of the present disclosure to improve accuracy of pedestrian detection by performing a different pedestrian detection method according to a distance between a vehicle and an object.

In addition, it is an aspect of the present disclosure to reduce an amount of calculation and increase a tracking processing speed by applying a different pedestrian tracking processing method according to a distance between a vehicle and an object.

Additional aspects of the disclosure will be set forth in part in the description which follows and, in part, will be obvious from the description, or may be learned by practice of the disclosure.

In accordance with one aspect of the present disclosure, a pedestrian detection method including transmitting and receiving a radar signal to and from an object in front of a vehicle to sense the object; capturing an exterior image of the vehicle; calculating a distance between the vehicle and the sensed object, detecting the sensed object in the captured image, and setting a region of interest (ROI) including the sensed object; and detecting a pedestrian in the ROI.

When the distance between the vehicle and the sensed object is smaller than a preset distance, the detecting of the pedestrian in the ROI may include detecting the pedestrian on the basis of a histogram of oriented gradient (HOG) method.

When the distance between the vehicle and the sensed object is greater than the preset distance, the detecting of the pedestrian in the ROI may include detecting the pedestrian in units of pixels.

The detecting of the pedestrian in the ROI may include displaying a bounding box outside the pedestrian sensed in the captured image.

A size of the ROI is set in inverse proportion to the distance between the vehicle and the sensed object.

In accordance with another aspect of the present disclosure, a pedestrian detection system including a radar sensor configured to transmit and receive a radar signal to and from an object in front of a vehicle to sense the object; an image capturer configured to capture an exterior image of the vehicle; and a controller configured to calculate a distance between the vehicle and the sensed object through the radar signal, detect the sensed object in the captured image, set an ROI including the sensed object, and detect a pedestrian in the ROI.

The controller may include a first classifier configured to detect the pedestrian on the basis of an HOG method when the distance between the vehicle and the sensed object is smaller than a preset distance; and a second classifier configured to detect the pedestrian in units of pixels when the distance between the vehicle and the sensed object is greater than the preset distance.

The system may include a display configured to display a bounding box outside the pedestrian sensed in the captured image.

A size of the ROI is set in inverse proportion to the distance between the vehicle and the sensed object.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a block diagram of a configuration of a pedestrian detection system according to one embodiment of the present disclosure;

FIG. 2 is a perspective view of an exterior of a vehicle equipped with the pedestrian detection system according to one embodiment of the present disclosure;

FIG. 3 is a block diagram for describing the configuration of the pedestrian detection system according to one embodiment of the present disclosure;

FIG. 4 is a schematic diagram for describing an operation of the pedestrian detection system according to one embodiment of the present disclosure;

FIG. 5 is a schematic diagram for describing a region of interest (ROI) according to one embodiment of the present disclosure;

FIG. 6 is a schematic diagram illustrating a pedestrian-detected display screen according to one embodiment of the present disclosure; and FIG. 7 is a flowchart illustrating a pedestrian detection method according to one embodiment of the present disclosure.

DETAILED DESCRIPTION

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein, and may be implemented in other forms. In the drawings, some portions not related to the description will be omitted and not shown to clearly describe the present disclosure, and also a size of a component may be somewhat exaggerated to facilitate understanding.

FIG. 1 is a block diagram of a configuration of a pedestrian detection system 1 according to one embodiment of the present disclosure, FIG. 2 is a perspective view of an exterior of a vehicle 2 equipped with the pedestrian detection system 1 according to one embodiment of the present disclosure, and FIG. 3 is a block diagram for describing the configuration of the pedestrian detection system 1 according to one embodiment of the present disclosure.

Referring to FIG. 1, the pedestrian detection system 1 includes a radar sensor 10, an image capturer 20, a controller 30, and a display 40.

The radar sensor 10 includes a radar module 11, and, as shown in FIG. 2, the radar module 11 may be positioned below a front hood of the vehicle 2 to sense one or more objects including vehicles or pedestrians ahead of the vehicle 2.

The radar module 11 senses a vehicle or a pedestrian ahead of the vehicle 2 and includes a radar sensor (not shown). At this point, a 77 gigahertz (GHz) radar may be typically used as the radar sensor, and the radar sensor may transmit a radar signal and measure a receiving time of the radar signal to calculate a distance to the sensed one or more objects, such as vehicles or pedestrians, ahead of the vehicle 2.

Particularly, the radar module 11 including the radar sensor (not shown) may obtain three-dimensional position information of a sensed object ahead thereof and, specifically, may obtain position information of an object using an X-axis and a Z-axis perpendicular to a Y-axis when a traveling direction of the vehicle 2 is the Y-axis.

For example, when the traveling direction of the vehicle 2 is the Y-axis, X, Y, and Z coordinates with respect to position information of a pedestrian detected by the radar sensor may be calculated.

At this point, the radar module 11 may select an object only having a confidence, which is obtained on the basis of a velocity, a size, and the like of the sensed object and exceeds a preset threshold value, as a pedestrian.

$$C=\alpha*r+\beta*v+\gamma*sd1+\varepsilon*sd1+\delta*sd2+\mu*vc_p+\omega*vc_g$$

At this point, r refers to a range of the sensed object, V refers to a velocity thereof, sd1 refers to a standard deviation of r, sd2 refers to a standard deviation of V, $vc_p$ refers to a velocity component of a process noise matrix, and $vc_g$ refers to a velocity component of a gain matrix, and r, V, sd1, sd2, $vc_p$, and $vc_g$ may be calculated on the basis of a radar signal transmitted from and received by the radar module 11, and also a confidence C may be calculated as a sum of r, sd1, sd2, $vc_p$, and $vc_g$ according to a ratio of a predetermined constant.

That is, $\alpha$, $\beta$, $\gamma$, $\varepsilon$, $\delta$, $\mu$, and $\omega$, which are required to calculate the confidence C, are parameters preset in the pedestrian detection system 1, and the confidence C is multiplied by r, sd1, sd2, $vc_p$, and $vc_g$.

Accordingly, when the calculated confidence C exceeds the preset threshold value, the sensed object is determined as an object that is detectable as a pedestrian, and thus position information, which includes information on X, Y, and Z coordinates of the sensed object, may be transmitted to the controller 30.

That is, the position information including the coordinates of the object, which is obtained through the radar sensor, may be transmitted to the controller 30.

Next, the image capturer 20 obtains an image ahead of the vehicle 2. Specifically, the image capturer 20 includes a camera module 21, and, as shown in FIG. 2, the camera module 21 may be installed below or above a rearview mirror 22 disposed behind a front window 17 of the vehicle 2 to capture the image ahead of the vehicle 2.

The camera module 21 includes an image sensor (not shown), typically uses a camera having one or more channels, and conventionally employs a complementary metal-oxide semiconductor (CMOS) as the image sensor. The CMOS image sensor is a semiconductor device that converts an exposed image into an electrical form and transmits the electrical form. However, the camera module 21 is not limited to the above-described CMOS image sensor, and may be implemented by a charge-coupled device (CCD) image sensor (not shown).

At this point, the camera module 21 may detect an object in an image that is acquired by the image sensor. Specifically, movement of a corresponding object in the image captured by the image sensor (not shown) may be sensed, a region of the corresponding object may be extracted from the image, and a plurality of objects may be distinguished from one another. At this point, the corresponding object is a detection target of image-processing, and may include objects such as a landscape, a panorama, a specific object, a pedestrian, and the like, and thus there is no limitation on objects that may be detection targets.

First, an outline of the object is extracted from the acquired image using deviation of adjacent red, green, and blue (RGB) values, and a variation of the outline is analyzed by comparing the acquired image with a previous image such that movement of the object may be determined.

Also, a region at which the movement of the object occurs may be obtained by setting a sensed region section as a set of set sections.

In addition, two or more objects may be merged or separated in a single image so that, in order to distinguish an accurate region of an object, an estimated position and a size of the object may be calculated through object tracking to extract a position and a region of the object.

However, the pedestrian detection system 1 according to the present disclosure detects and tracks a pedestrian positioned in front of the vehicle 2.

At this point, the camera module 21 transmits information on the extracted object including the information on the acquired image to the controller 30 at regular time intervals.

Accordingly, the camera module 21 transmits the information on the detected movement of the object in the acquired image, the region of the object, and a plurality of overlapping objects to the controller 30, and position information of the object may be calculated on the basis of the two-dimensional information of the acquired image.

As one example, a pedestrian included in an image acquired through the camera module 21 may be obtained in a form of, for example, information on two-dimensional U- and V-axis coordinates.

Next, the controller 30 of the pedestrian detection system 1 according to the present disclosure collectively controls the pedestrian detection system 1.

Specifically, the controller 30 mediates data input and output between various components included in the pedestrian detection system 1 and the image capturer 20, and the controller 30 may include a main processor 31 configured to perform tracking on the basis of coordinate information of an object sensed through the radar sensor 10 or the image capturer 20, and a memory 32 configured to store programs and data of the main processor 31.

Specifically, FIG. 3 is a block diagram for describing the configuration of the pedestrian detection system 1 according to one embodiment of the present disclosure.

As shown in FIG. 3, the controller 30 includes a distance converter 33, a region of interest (ROI) generator 34, a classifier 35, and a processor 38 including a first processor 36 and a second processor 37, which are each provided in a form of software and are sequentially performed for detecting a sensed object as a pedestrian.

First, the distance converter 33 may match distance information of an object including a vehicle or a pedestrian which exists ahead of the vehicle 2 to an object in an image acquired through the image capturer 20 on the basis of distance information on the object received by the radar module 11.

For example, as shown in FIG. 5, on a screen on a display, it can be seen that an object located far away from the vehicle 2 equipped with the pedestrian detection system 1 of the present disclosure is located at a position above the center of the screen, while an object located close to the vehicle 2 is located at a position slightly out of the center thereof.

In addition, the position information of the object sensed by the radar sensor 10 includes distance information on X-, Y-, and Z-axes, and may be matched to object information sensed in the acquired image.

Accordingly, the distance converter 33 in the controller 30 may match the acquired image to the distance information of the object sensed by the radar sensor 10 and convert the object information sensed by the radar sensor 10 into two-dimensional distance information of the acquired image.

Next, the ROI generator 34 generates an ROI for an object including two-dimensional distance information. Specifically, the reason for generating the ROI is so that the ROI is set in the image acquired through the image capturer 20, and, when a pedestrian is detected in the ROI, the pedestrian should be detected only when a height of the pedestrian does not exceed a threshold value.

Specifically, the ROI generator 34 may generate the ROI by applying a pyramid method. The pyramid method refers to a method for generating an ROI of a candidate pedestrian on the basis of the distance information of the object acquired by the radar sensor 10.

At this point, a level in the pyramid method is determined by rounding off a value of the candidate pedestrian log-transformed on the basis of a ratio value between a sensed height of the pedestrian and a threshold size of a pedestrian in a preset pixel (e.g., the threshold size of the pedestrian in a pixel may be set to 0.84).

Consequently, when the object obtained by the radar sensor 10 is far away from the vehicle 2, a pyramid level generated by the ROI generator 34 is calculated to be a small value, and, when the object obtained by the radar sensor 10 is close to the vehicle 2, the pyramid level generated by the ROI generator 34 is calculated to be a large value.

Specifically, as shown in FIG. 4, when assuming that a pedestrian P1 and a pedestrian P2 have the same size (that is, the same height), a size of a pedestrian in the image acquired by the image capturer 20 of the vehicle 2 is varied according to a distance thereof from the vehicle 2.

That is, since the pedestrian P1 is closer to the vehicle 2 in distance than the pedestrian P2, the size of the pedestrian P1 acquired by the image capturer 20 appears to be greater than that of the pedestrian P2. In addition, when the image shown in FIG. 5 is checked, the less the distance is, the more off the center of the screen the pedestrian will be.

Accordingly, the ROI may be generated by varying a threshold value of a size that is detectable as a pedestrian in proportion to a distance between the sensed pedestrian and the vehicle 2.

Consequently, as shown in FIG. 4, the classifier 35 classifies whether to perform a pedestrian processing method on the sensed pedestrian in the first processor 36 or in the second processor 37 according to the ROI generated in the ROI generator 34.

Specifically, as one example, by the classifier 35 according to the pyramid method, a case in which the calculated pyramid level value is greater than a preset level value may be classified to be performed in the first processor 36, and a case in which the calculated pyramid level value is less than the preset level value may be classified to be performed in the second processor 37.

At this point, the classifier 35 may classify the sensed object so that a pedestrian is processed in the first processor 36 or in the second processor 37 according to the size of the ROI. When the sensed object is close in distance, the sensed object is included in an ROI having a wide region and processed in the first processor 36, and, when the sensed object is far away in distance, the sensed object is included in an ROI having a relatively narrow region and processed in the second processor 37.

Consequently, after the ROI is set by the controller 30, the generated ROI is processed in the first processor 36 or in the second processor 37 according to the classifier 35 such that the pedestrian in the ROI is detected.

At this point, the determination of whether the generated ROI is processed in the first processor 36 or the second processor 37 is performed according to the distance acquired by the distance converter 33. Specifically, FIGS. 4 and 5 are schematic diagrams for describing a process of the generated ROI in each of the first processor 36 and the second processor 37.

In FIG. 4, a processing region processed in the first processor 36 and a processing region processed the second processor 37 are separated according to distance, and a region indicated by a dotted line is drawn in FIG. 5, and thus a region corresponding to a region outside the dotted line is a distance region corresponding to a processing region processed in the first processor 36 of FIG. 4 and refers to a near-field region of the vehicle 2, and a region corresponding to an area inside the dotted line is a distance region corresponding to a processing area processed in the second processor 37 of FIG. 4 and refers to a far-field region of the vehicle 2.

When an object detected through the radar sensor 10 is determined to be located at a position (that is, a first region) closer than a preset threshold distance, the first processor 36 performs a pedestrian detection method on each cell to detect a pedestrian in an ROI.

Specifically, the performing of the pedestrian detection method on each of the cells refers to detecting the pedestrian through a Haar wavelet feature-based method, a histogram of oriented gradient (HOG) method, a local receptive field (LRF) method, and the like.

That is, a HOG calculation method based on a cell unit histogram may detect a pedestrian by rotating a directional histogram of a HOG feature, and may more stably represent a feature of an object against distortion such as inclination or variation in size, and thus it is advantageous to perform the HOG calculation method when a feature of a pedestrian is easily detected in the near-field region.

In the first processor 36 performing the cell-based pedestrian detection method, a plurality of pixels exist in a single cell.

Next, when the object sensed through the radar sensor 10 is determined to be located at a position (that is, a second region) that is farther than the preset threshold distance, the second processor 37 performs the pedestrian detection method on each pixel. This is because a pedestrian located in the far-field region is small in size, and thus it is advantageous to detect a pedestrian included in a far-field image for each of pixels configuring the cell while tracking the pedestrian.

Accordingly, the pedestrian detection system 1 according to the present disclosure may detect the pedestrian in the ROI through the processor 38. Specifically, FIG. 6 is a display screen illustrating that a pedestrian is detected by the controller 30 of the pedestrian detection system 1 according to the present disclosure.

In a plurality of ROIs including the sensed object of FIG. 5, it can be seen that a pedestrian included in the ROI is detected through the classifier 35 and the processor 38.

Next, the information processed in the main processor 31 may be stored in the memory 32.

That is, the memory 32 may be configured to temporarily store a control program and control data for controlling an operation of the pedestrian detection system 1, and various control signals including information obtained by the radar sensor 10 and the image capturer 20, and object tracking information processed by the main processor 31.

Specifically, the memory 32 may include a volatile memory, such as a static random access memory (S-RAM), a dynamic random access memory (D-RAM), and the like, and may also include a nonvolatile memory, such as a flash memory, a read only memory (ROM), an erasable programmable read only memory (EPROM), an electrically erasable programmable read only memory (EEPROM), and the like.

Specifically, the nonvolatile memory may be configured to semi-permanently store the control program and the control data for controlling the operation of the pedestrian detection system 1, and the volatile memory may be configured to retrieve and temporarily store the control program and the control data from the nonvolatile memory, the information acquired by the image capturer 20 and the radar sensor 10, and the tracking information processed by the controller 30.

Next, the display 40 may display object information detected and tracked by the controller 30 to a driver through a display part, and, although not shown in the drawing, the pedestrian detection system 1 according to the present disclosure may include a warning part (not shown) and warn of a case in which a detected and tracked object is close to the vehicle 2 using, for example, a sound.

The configuration of the pedestrian detection system 1 according to one embodiment of the present disclosure has been described above.

Hereinafter, an operation of the pedestrian detection system 1 according to one embodiment of the present disclosure will be described.

FIG. 7 is a flowchart illustrating an operation method of the pedestrian detection system 1 according to one embodiment of the present disclosure.

As shown in FIG. 7, the radar module 11 is operated to start an object tracking control method according to the present disclosure (S10).

At this point, the radar module 11 detects an object ahead of the vehicle 2 (S20). Specifically, the radar module 11 may transmit a radar signal toward the front object to calculate three-dimensional coordinates of the front object on the basis of a time required for the radar signal to return and direction information (S30). Accordingly, the three-dimensional coordinates of the detected front object are transmitted to the controller 30, and the pedestrian detection system 1 generates ROIs including a plurality of sensed objects on the basis of information on a position and a velocity of the detected front object (S20).

At this point, the generated ROIs are varied in size according to a distance from the vehicle 2 (S30), and, when a distance between each of the generated ROIs and the vehicle 2 is greater than a preset threshold distance (YES in S40), a pedestrian is detected for each pixel (S50).

Otherwise, when the distance between each of the generated ROIs and the vehicle 2 is less than the preset threshold distance (NO in S40), the pedestrian is detected for each cell (S60).

As is apparent from the above description, even when object detection fails, an object can by continuously detected by using both a radar sensor and an image sensor.

Also, different pedestrian recognition methods are performed according to a distance between a vehicle and an object such that accuracy of pedestrian detection can be improved.

In addition, an amount of calculation can be reduced by applying a different pedestrian tracking processing method according to a distance.

Although the present disclosure has been described above by way of specific embodiments and the accompanying drawings, the present disclosure is not limited thereto, and it should be understood that numerous modified embodiments can be devised by those skilled in the art without departing from the gist defined by the appended claims, and such modified embodiments may not be individually understood from the present disclosure.

What is claimed is:

1. A pedestrian detection method comprising:
    transmitting and receiving a radar signal to and from an object in front of a vehicle to sense the object;
    capturing an exterior image of the vehicle;
    calculating a distance between the vehicle and the sensed object, detecting the sensed object in the captured image, and setting a region of interest (ROI) including the sensed object;
    selecting, according to the distance between the vehicle and the sensed object, one pedestrian detection method among a plurality of pedestrian detection methods including a first pedestrian detection method detecting the pedestrian in a unit of a pixel and a second pedestrian detection method detecting the pedestrian in a unit of a cell including a plurality of pixels; and detecting a pedestrian in the ROI according to the selected one pedestrian detection method.

2. The method of claim 1, wherein the detecting of the pedestrian in the ROI includes, when the distance between the vehicle and the sensed object is less than a preset distance, detecting the pedestrian in the unit of the cell including the plurality of pixels.

3. The method of claim 1, wherein the detecting of the pedestrian in the ROI includes, when the distance between the vehicle and the sensed object is greater than a preset distance, detecting the pedestrian in the unit of the pixel.

4. The method of claim 1, wherein the setting the ROI comprises setting a size of the ROI in inverse proportion to the distance between the vehicle and the sensed object.

5. A pedestrian detection system comprising:
a radar sensor configured to transmit and receive a radar signal to and from an object in front of a vehicle to sense the object;
an image capturer configured to capture an exterior image of the vehicle; and
a controller configured to calculate a distance between the vehicle and the sensed object through the radar signal, detect the sensed object in the captured image, set a region of interest (ROI) including the sensed object, select, according to the distance between the vehicle and the sensed object, one pedestrian detection method among a plurality of pedestrian detection methods including a first pedestrian detection method detecting a pedestrian in a unit of a single pixel and a second pedestrian detection method detecting the pedestrian in a unit of a cell including a plurality of pixels, and detect the pedestrian in the ROI according to the selected one pedestrian detection method.

6. The system of claim 5, wherein the controller includes:
a first processor configured to detect the pedestrian on the basis of a histogram of oriented gradient (HOG) method when the distance between the vehicle and the sensed object is smaller than a preset distance; and
a second processor configured to detect the pedestrian in units of pixels when the distance between the vehicle and the sensed object is greater than the preset distance.

7. The system of claim 5, wherein the controller includes:
a first processor configured to detect the pedestrian in the unit of the cell including the plurality of pixels when the distance between the vehicle and the sensed object is less than a preset distance; and
a second processor configured to detect the pedestrian in the unit of the pixel when the distance between the vehicle and the sensed object is greater than the preset distance.

8. The system of claim 5, wherein a size of the ROI is set in inverse proportion to the distance between the vehicle and the sensed object.

9. The system of claim 5, wherein the controller is configured to:
calculate a confidence based on information of the object sensed based on the radar signal; and
determine the sensed object as an object detectable as the pedestrian when the calculated confidence is greater than a preset threshold value.

10. A pedestrian detection method comprising:
transmitting and receiving a radar signal to and from an object in front of a vehicle to sense the object;
capturing an image of the vehicle;
calculating a distance between the vehicle and the sensed object, and calculating a confidence based on information of the object sensed based on the radar signal;
when the calculated confidence is greater than a preset threshold value, identifying the sensed object as an object detectable as the pedestrian;
detecting the object detectable as the pedestrian in the captured image, and setting a region of interest (ROI) including the object detectable as the pedestrian;
detecting the pedestrian in the ROI by selecting, according to the distance between the vehicle and the sensed object, between one method detecting the pedestrian in a unit of a pixel and another method detecting the pedestrian in a unit of a cell having a plurality of pixels.

* * * * *